United States Patent Office 3,766,147
Patented Oct. 16, 1973

3,766,147
CONDENSATION OF CYCLIC NITRILE CARBONATES WITH FLUORIDE COMPOUNDS
Larry G. Wolgemuth, Cherry Hill, N.J., assignor to Atlantic Richfield Company, New York, N.Y.
No Drawing. Filed July 31, 1972, Ser. No. 276,640
Int. Cl. C08g 22/00
U.S. Cl. 260—77.5 R
16 Claims

ABSTRACT OF THE DISCLOSURE

A method of preparing organic compounds having one or more urea, urethane or thiourethane groups by reacting cyclic nitrile carbonates of the formula:

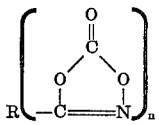

wherein, R is an organic radical which is free of reactive hydrogen atoms and $n$ is 1 or more, such as, adiponitrile carbonate, with nucleophilic compounds containing a reactive hydrogen atom, such as, polyester and polyether triols, in the presence of a catalytically-effective amount of an inorganic or an organic fluoride, such as, KF, CsF, RbF, tetraalkylammonium fluoride, etc. at a temperature of about $-10$ to $150°$ C.

BACKGROUND OF THE INVENTION

The present invention relates to an improved method for preparing organic compounds having one or more urea, urethane or thiourethane groups by reacting compounds having a reactive hydrogen atom with cyclic nitrile carbonates. More particularly, the present invention relates to an improved method of preparing organic compounds having one or more urea, urethane or thiourethane groups by reacting compounds having a reactive hydrogen atom with cyclic nitrile carbonates in the presence of a catalyst comprising inorganic or organic fluorides.

In the past, it has been common practice to prepare ureas, urethanes and thiourethanes by the reaction of an isocyanate and an active hydrogen-containing material. Although the use of isocyanates for the preparation of ureas, urethanes and thiourethanes is quite popular and extensively employed, there are a number of problems with this reaction. First, the isocyanates are unstable and present storage and handling difficulties. Secondly, many isocyanates, particularly the aliphatic isocyanates, are highly toxic. Third, the reactivity of the —NCO group precludes premixing of the isocyanate with the reactive hydrogen-containing material to form a single component system without first blocking the terminal isocyanate groups. However, curing the blocked isocyanate materials to liberate the blocking group and to reactivate the —NCO group requires high curing temperatures. Finally, in the production of foamed polyurethanes, polythiourethanes and polyureas, via the isocyanate route, it is necessary to go through the expense and inconvenience of adding a separate foaming agent or of using an excess of isocyanate and water to obtain the required gas release.

The disadvantages mentioned above are not, however, present in a process for preparing such organic compounds by condensation of a compound containing a reactive hydrogen with a compound having the following structural formula:

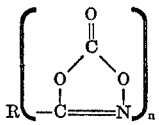

wherein R is an organic radical free of reactive hydrogen atoms and $n$ is 1 or more. For convenience, the compounds identified by the above structural formula will be hereafter referred to as "cyclic nitrile carbonates."

There are now 3 techniques for carrying out the reaction of an active hydrogen-containing material with cyclic nitrile carbonates in the presence of catalysts. For example, in U.S. Pat. 3,531,425, a process is described in which the reaction is carried out in the presence of a strong base, such as, tertiary amines, having a pKa above 8. In U.S. Pat. 3,652,507, the reaction is carried out in the presence of soluble catalysts containing a first metal from Groups III through V of the Periodic System and a second metal from Groups I, II or the iron series of Group VIII of the Periodic System. Finally, in U.S. Pat. No. 3,702,320 by Larry G. Wolgemuth et al., it is disclosed that the reaction may be carried out in the presence of a soluble compound of aluminum, tin, titanium, zinc, bismuth, or iron at a temperature of about 120 to 150° C., provided that, when the metal is aluminum, tin, titanium or bismuth, no metal of Group I, II or the iron series of Group VIII are present and, when the metal is zinc or iron, the reaction is conducted in the absence of metals of Groups III through V. It was found in accordance with U.S. Pat. 3,652,507 that, in most cases, strongly basic materials (alkali metal alkoxides, tertiary amines, etc.) must be utilized in conjunction with the catalyst in order to obtain reaction rates which are acceptable for foam formation.

It is therefore an object of the present invention to prepare organic compounds having one or more urea, urethane or thiourethane groups by reacting a cyclic nitrile carbonate with an organic compound having an active hydrogen in the presence of a novel catalyst. Another object of the present invention is to provide an improved process for the preparation of organic compounds having one or more urea, urethane or thiourethane groups by reacting cyclic nitrile carbonates with an organic compound having a reactive hydrogen, in which the rate of reaction for foam formation is reduced. Yet another object of the present invention is to provide an improved process for the preparation of organic compounds having one or more urea, urethane or thiourethane groups by reacting cyclic nitrile carbonates with an organic compound having an active hydrogen in which it is unnecessary to utilize a strong basic material.

These and other objects and advantages of the present invention will be apparent from the following detailed description.

SUMMARY OF THE INVENTION

A method of preparing organic compounds having one or more urea, urethane or thiourethane groups comprising reacting at least one cyclic nitrile carbonate of the formula:

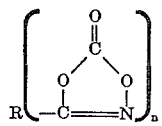

wherein, R is an organic radical free of nucleophilic groups by the Zerewitinoff test and $n$ is 1 or more, with a nucleophilic organic compound having at least one reactive hydrogen atom as determined by the Zerewitinoff test in the presence of a catalytically effective amount of a fluoride compound selected from the group consisting of organic and inorganic fluorides.

DESCRIPTION OF THE INVENTION

As previously indicated, urea, urethane or thiourethane organic compounds may be prepared by prior art techniques by condensing nucleophilic compounds having a reactive hydrogen atom with cyclic nitrile carbonates in the presence of a strong base as a catalyst or metallic catalysts having metal ions, such as, $Al^{+3}$, $Sn^{+2}$, $Sn^{+4}$, $Ti^{+4}$, $Zn^{+4}$, etc. However, in the latter case, it was found that, in most cases, in order to obtain rates of reaction acceptable for foam formation, it was also necessary to utilize a strongly basic material in conjunction with the metal ion. By way of contrast, it has been found, in accordance with the present invention, that it is not necessary to use strongly basic compounds in conjunction with the catalyst provided the catalyst system contains an organic or an inorganic fluoride compound.

A broad spectrum of inorganic fluoride catalysts are particularly useful and include, preferably, metal fluorides wherein the metal is selected from Group I-A of the Periodic System which are alkali metal fluorides such as sodium fluoride, potassium fluoride, cesium fluoride and rubidium fluoride.

Organic fluoride catalysts in this invention include quaternary ammonium fluorides and quaternary phosphonium fluorides having the anion $XR_4$ wherein X is nitrogen or phosphonium and R is independently selected from alkyl, aryl, alkaryl or aralkyl radicals. Generally, the alkyl is a lower alkyl having from 1 to 6 carbon atoms and the aryl is phenyl; the alkaryl may be an alkyl substitute phenyl having one or more alkyl substituents of 1 to 6 carbon atoms. Specifically, useful catalysts include tetramethyl ammonium fluoride, tetraethyl ammonium fluoride, tetrapropyl ammonium fluoride, tetraphenyl ammonium fluoride, benzyltrimethyl ammonium fluoride, and benzyldimethylphenyl ammonium fluoride. Tetramethyl phosphonium fluoride, tetraphenyl phosphonium fluoride, as well as quaternary phosphonium fluorides corresponding to the aforementioned ammonium compounds may be used.

The fluoride compounds mentioned generally form hydrates. While either the anhydrous or hydrated forms may be utilized, it is preferred that the fluoride be maintained in its anhydrous state.

Each of the above-mentioned fluorides may be utilized alone. However, the fluoride compounds may also be combined with one or more metals from Groups III through V of the Periodic System. Preferably, a combination of one of the fluoride compounds and a metal from Groups III through V are utilized.

While it is not intended to limit the present invention to any particular theory, it is believed that the fluoride ion of the fluorides, such as, sodium fluoride, potassium fluoride, cesium fluoride and rubidium fluoride, rather than the sodium, potassium, cesium and rubidium ions catalyzes the reaction. This, of course, is in direct contrast to U.S. Pat. 3,652,507 wherein the alkali metal ion is the active catalyst.

As previously indicated, cyclic nitrile carbonates, useful in accordance with the present invention, have the following formula:

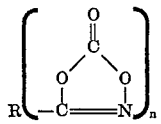

wherein, R is an organic radical having from 1 to about 200,000 carbons atoms and is free of nucleophilic groups and can be aliphatic or aromatic including cycloaliphatic, alkaryl or aralkyl radicals and $n$ is 1 to about 100,000.

The R radical in the above formula for the cyclic nitrile carbonate represents a monomeric or polymeric organic structure which is free of nucleophilic groups containing reactive hydrogen atoms as determined by the Zerewithinoff test. A compound which contains a reactive hydrogen as determined by the Zerewitinoff test is one which, when contacted with a Grignard solution of methyl iodide, will effect the liberation of methane by decomposition of the Grignard reagent. Frequently R will consist essentially of carbon and hydrogen atoms and by "consisting essentially of carbon and hydrogen" is meant that the essential composition of the radical is carbon and hydrogen but that there can be included therein other elements as well, so long as they do not materially affect the radical's basic characteristic of being non-interferring in the condensation reaction of the cyclic nitrile carbonate group with the hydroxyl group. Examples of non-interferring groups which can be present in R and which contain elements other than carbon and hydrogen are alkoxy, nitro, and halo groups. The R radical can be aromatic, e.g., of 1 to 3 aromatic rings (fused or non-fused) or non-aromatic and, when the latter, can by cyclic or acyclic and saturated or ethylenically or acetylenically unsaturated. Groups which decompose easily when slightly heated or agitated as, for example, vinylacetylenic groups, are preferably not present in R. Acyclic R's can be straight or branched chain. The cyclic nitrile carbonate group can be attached to an aromatic ring carbon atom, or to a cycloaliphatic ring carbon atom, or to a non-ring carbon atom. When R is aromatic it is preferred that no two cyclic nitrile carbonate groups occupy ortho positions with respect to one another. The molecular weight of the cyclic nitrile carbonate will often be below about 75,000.

The cyclic nitrile carbonate used in the process of the present invention can be prepared by phosgenating the corresponding hydroxamic acid, preferably while the latter is in solution in a stable solvent. The hydroxamic acid, in turn, can be prepared by various methods known in the art, such as, for example, by reacting the methyl ester of the corresponding carboxylic acid with hydroxylamine. Examples of suitable cyclic nitrile carbonates include, for instance, cyclohexane nitrile carbonate; ethane nitrile carbonate; propane-2-nitrile carbonate; ethene nitrile carbonate; cyclohexene-3-nitrile carbonate; benzene nitrile carbonate; 2,2-diphenylpropane-4,4'-di(nitrile carbonate); 4-vinylbenzene-1-nitrile carbonate; 1-vinylanthracene-3,9-di(nitrile carbonate); butane-1,4-di(nitrile carbonate); hexane - 1,6 - di(nitrile carbonate); benzene - 1,4 - di (nitrile carbonate); naphthalene - 1,4 - di(nitrile carbonate); etc.

The cyclic nitrile carbonate used in the process of the present invention can also be derived from other cyclic nitrile carbonates. Thus, for example, an addition-polymerizable, ethylenically-unsaturated, cyclic nitrile carbonate, such as ethene nitrile carbonate, can be addition polymerized with a dissimilar monomer, such as, styrene or acrylonitrile, to yield a polymeric cyclic nitrile carbonate which is suitable for use in the process of the present invention. Also, a polyfunctional cyclic nitrile carbonate, such as, hexane-1,6-di(nitrile carbonate) can be condensed-rearranged in stoichiometrically excessive amounts with a hydroxyl group-containing compound as used in the present process to yield a urethane group-containing cyclic nitrile carbonate which is suitable for use in the process of the present invention. The latter condensation-rearrangement can be catalyzed by any suitable system—for example, using a strong base or combination metal catalyst of the prior art, or by using the catalyst of this invention. Also, suitable cyclic nitrile carbonates for use as reactants in the present process can be obtained by condensing-rearranging stoichiometrically excessive amounts of a polyfunctional cyclic nitrile carbonate with a compound having one or more primary amino, secondary amino, or mercapto groups—for example, as disclosed in the aforementioned U.S. Pats. 3,531,425 and 3,652,507, which disclosures are incorporated herein by reference. The resultant condensation-rearrangement products contain urea or thiourethane groups, in addition to the unreacted, excess cyclic nitrile carbonate groups.

Although the production of the low molecular weight aliphatic and aromatic cyclic nitrile adducts wherein $n$ ranges up to 4 has been described in detail in U.S. Pats.

3,531,425 and 3,652,507, higher molecular weight adducts, wherein n is 5 or higher, can be prepared by the homopolymerization of the vinyl derivatives of the cyclic nitrile carbonates, for example, vinyl nitrile carbonate having the structure:

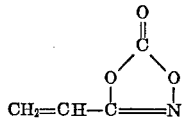

Likewise these vinyl compounds can be copolymerized with one or more polymerizable monomers, for example, olefinically unsaturated hydrocarbons, esters, ethers, aldehydes, ketones, nitriles, amides, halogen compounds, carboxylic acid or anhydride compounds and like monomers which are not nucleophilic compounds, i.e., those free of reactive hydrogen atoms as determined by the Zerewitinoff test, or free of positive metal ions or a positive ammonium ion which would react with the cyclic nitrile group. Examples are the mono- and diolefins such as ethylene, propylene, butadiene, styrene, vinyl ethers, vinyl esters, the acrylates, methacrylates, acrylonitrile, vinyl chloride, maleic anhydride and the like. The production of these high molecular polycyclic nitrile adducts is likewise disclosed in U.S. Pats. 3,480,595 and 3,652,507 both of which are incorporated herein by reference.

The polymerization can be catalyzed by conventional polymerization catalysts, particularly of the free-radical type such as the peroxide type compounds, e.g., benzoyl peroxide, the azo compounds, ultra-violet light, and beta or gamma irradiation.

The nucleophilic organic compounds reacted with the cyclic nitrile carbonates according to the present invention are organic compounds having at least one reactive hydrogen atom and include compounds having the reactive hydrogen present in one or more hydroxyl, primary amino, secondary amino, or marcapto groups. These nucleophilic compounds may be simple compounds of relatively low molecular weight, or they may be high molecular weight compounds, such as, polymeric materials, for instance, having molecular weights of at least about 200 up to about 75,000 or more. The nucleophile can be monofunctional, that is, containing one reactive hydrogen, or polyfunctional (including difunctional), that is, containing more than one reactive hydrogen. The preferred nucleophilic compounds contain a reactive hydrogen at terminal ends of the longest chain of the molecule.

In accordance with the invention, one or more of the nucleophilic compounds may be reacted with the cyclic nitrile carbonate to provide a variety of organic products containing urethane, urea, or thiourethane groups, or mixtures of the foregoing. The products may be monomeric or polymeric depending upon the cyclic nitrile carbonate and nucleophile selected, the proportions of reactants employed and the reaction conditions utilized.

Suitable nucleophilic organic compounds having an active hydrogen atom, for use in the present process, include compounds having the active hydrogen present in —OH, —NH, —NH$_2$, —SH, —SO$_2$NH$_2$, —SO$_2$OH, —COOH, —CSNH$_2$ and —CONHR groups. Nucleophiles having an active hydrogen atom may be further identified as those that give a positive Zerewitinoff test, that is, any compound which, when added to a Grignard solution of methyl iodide, liberates methane by decomposition of the Grignard reagent. Nucleophilic compounds, of the desired type, are disclosed in detail in U.S. Pats. 3,531,425 and 3,652,507, which disclosures are incorporated herein by reference. Of particular interest are polyols (hydroxyl-rich compounds having at least 2 —OH groups) as disclosed in U.S. Pat. No. 3,702,320, which disclosure is also incorporated herein by reference.

The amounts and ratio of catalysts employed will also vary depending upon the type of product, the temperature and the desired properties of the product. By way of example, the fluoride catalyst should be present in an amount of from about 0.01% to about 5%, preferably from about 0.1 to about 2%, by weight, based on the weight of the reactants and the metal ion of Groups III to V of the Periodic Table may be present in an amount of about 0.1% to about 5%, preferably from about 0.1 to about 2%, by weight of the reactants. The ratio of fluoride catalyst to Group III to V metal ion may be up to about 1:1 and preferably in the range of 0.3 to 1:1.

The reaction is generally carried out at a temperature between about —10° C. and 150° C. and preferably between 25° and 100° C.

The reaction which is catalyzed by the improved method of the present invention may be carried out as a single stage operation or in multiple stages employing more of the same or different cyclic nitrile carbonate reactant or the same or different H-containing nucleophilic compound. Thus, in polymer product production, the process, for example, may be what is termed in the art as a "one-shot" process. Alternatively, a prepolymer of the nitrile carbonate reactant and the active hydrogen-containing reactant can be prepared by employing an excess of either reactant but preferably an excess of the cyclic nitrile carbonate reactant. The prepolymer formed may then be subsequently reacted with either more of the same or a different cyclic nitrile carbonate reactant or with more of the same or a different nucleophile depending on the groups terminating the ends of the prepolymer.

When the nucleophilic compound contains an active hydrogen in a hydroxyl group, then mono- or polyurethane products are prepared, while if the group containing the active hydrogen is an amino group, mono- or polyurea products are obtained. Reaction of the cyclic nitrile adduct reactant with both a hydroxyl group-containing compound and an amino group-containing compound, either simultaneously or sequentially, provides urea-urethane products. And when the nucleophilic compound contains an active hydrogen in a mercapto group, then mono- or polythiourethane products are obtained.

As indicated above, the improved process of the present invention has been found to be capable of providing polycondensation products having exceptionally high molecular weights, for example, having weight average molecular weights of about 150,000 or higher. Moreover, where these polycondensation products are prepared from difunctional cyclic nitrile carbonates and difunctional nucleophilic compounds, they are soluble in a variety of organic solvents, such as, chloroform, tetrahydrofuran, dimethylformamide, dimethylsulfoxide, and aromatic hydrocarbon solvents. This unique solubility characteristic of the high molecular weight polymers is apparently a result of a substantially linear (i.e., non-crosslinked) configuration of the polymer molecules, which configuration is further evidenced by the thermoplastic character of the products. Especially preferred polycondensation products of the present invention are those having weight average molecular weights of at least about, say, 200,000 or even 300,000, and further unique are those products of greater than about 500,000 molecular weight. Preferably these are obtained from difunctional reactants and are soluble in, for example, chloroform, although it is recognized that even the difunctional reactants-derived products of the present invention become less soluble as their molecular weights increase.

In general, then, the method of the present invention can be utilized to prepare higher molecular weight products, e.g., polyurethanes, than can be made by employing other condensation reaction catalysts, such as, the amine catalysts, for example. Also, the method of the present invention, when used to prepare polycondensation products, such as, polyurethanes from difunctional reactants, can provide organic solvent-soluble, thermoplastic products of much higher molecular weights than have been obtainable by the conventional isocyanate reactions.

A further advantage of the process of the present invention is that the present condensation reaction proceeds without the formation of the hydroxamates which are produced, either as intermediates or as end products, when no catalyst is employed or when catalysts, such as, amines are used. The formation of such hydroxamates, which inhibits the preparation of high molecular weight polycondensation products, is discussed in our above-mentioned U.S. Pat. 3,531,425.

It is possible in accordance with the present invention to produce cellular or nonporous plastics, including films, coatings, adhesive layers, impregnated compositions, castings, moldings and the like. However, in the production of polyurethane foams by the process of the invention, it is not necessary, as it is in conventional prior art processes, to employ an extraneous foaming or blowing agent since the cyclic nitrile carbonate reactants contain their own internal or "built in" blowing agent, namely the carbon dioxide gas they evolve during reaction with the nucleophilic compounds. Conventional foaming agents, however, may be employed if desired, among which may be listed: low boiling solvents, such as, benzene, toluene, acetone, ethyl ether, butyl acetate, methylene dichloride, carbon tetrachloride and the like, as well as agents which will decompose to evolve an inert gas as, for instance, ammonium carbonate, sodium bicarbonate, N,N-dimethyl - N,N' - dinitroso - terephthalamide, para,para'-oxybis (benzenesulfonic acid), azodicarbonamide, benzene sulfonyl hydrazide, axodiisobutyronitrile, paratertiary butyl benzoyl-azide and the like.

Formulation of polyurethane foams can follow the well-established practice of the art with the notable exception that the conditions of the reaction between the cyclic nitrile carbonate compound and nucleophilic compound be controlled to effect the reaction at a rate slow enough to preclude escape of the evolved $CO_2$ gas before gelation to the extent sufficient to entrap the evolved gas and form a cellular, elastomeric polyurethane has occurred.

When preparing foamed products by the method of the present invention it is generally preferred to employ at least a trirfunctional reactant, which can be either the cyclic nitrile carbonate, the nucleophilic compound, or both. Thus, for example, excellent polyurethane foams can be prepared by condensing a difunctional cyclic nitrile carbonate with a triol to yield a cross-linked product.

If desired, surface active agents might be in concentrations of about 0.1 to 5% by weight of the reactants to stabilize the foam. Generally used are silicone emulsifiers and non-ionic surface active agents, such as, ethylene oxide condensates of vegetable oils, alcohols, and organic acids.

In accordance with the usual practice, inert, inorganic or organic fillers, or both, and other additives may be included in the reaction mixture. Suitable inert, inorganic materials include, for example, clay, talc, silica, carbon black, asbestos, glass, mica, calcium carbonate, antimony oxide and the like. Organic fillers include, for instance, the various polymers, copolymers and terpolymers of vinyl chloride, vinyl acetate, acrylonitrile, acrylamide, styrene, ethylene, propylene, butadiene, divinylbenzene, etc. Other additives which may be added include plasticizers, such as, dioctyl phthalate, di(2-ethylhexyl)adipate, etc., extenders, softeners, coloring agents and emulsifiers.

The products produced by the invention have many uses. For example, the products are excellent materials for use in the preparation of castings, molds, sealants, potting compounds, insecticides, adhesives, coatings, films, etc.

In a preferred method of preparing, for example, polyurethanes by the process of the present invention, the polyol reactant is degassed prior to being admixed with either the catalyst or the poly(nitrile carbonate). The purpose of the degassing is to remove water and molecular oxygen from the system. Water might serve to react with and dilute the effect of some of the catalysts which can be used in the present process; also, it can react with the cyclic nitrile carbonate reactant under certain conditions. Certain hydroxyl group-containing compounds, e.g., poly (tetramethylene ether), are sensitive to molecular oxygen at the present reaction temperatures. Thus, the reason for preferring, under appropriate circumstances, to purge moisture and oxygen from the hydroxyl group-containing reactant. The degassing can often be accomplished by subjecting the polyol to a temperature of about 60 to 150° C. at about 0.25 to 50 mm. Hg pressure for from 15 to 60 minutes. After the addition of the catalyst, further degassing—say, for up to about 4 hours—under the same conditions may be conducted. After addition of catalyst and such further degassing, a substantially oxygen-free atmosphere, for example, a nitrogen or other inert gas atmosphere, is advantageously created and maintained in the reaction vessel, during which time the desired poly (nitrile carbonate) is added, preferably in small portions over periods of, say, about three minutes to two hours. During the addition of the carbonate the reaction mixture can be stirred. Following complete addition of the carbonate, the temperature of the reaction mixture is maintained at a level and the reaction time is selected so as to produce the desired product. The reaction mixture is advantageously stirred during the reaction. It is often advantageous to add a solvent for the urethane product, such as, xylene, to the reaction mixture gradually, as the mixture thickens, to keep the mixture at a suitable viscosity. This is especially so where the product is a thermoplastic polyurethane. The amount of solvent added will preferably not exceed the total weight of the reactants. Preferred solvents for this purpose are aromatic solvents and cyclic ether solvents which are liquid at room temperature, having boiling points of at least about 60° C., and contain no ester or nitro groups. Examples of such include, in addition to the xylenes, amylbenzene, bromobenzene, chlorobenzene, substituted toluenes, such as, butyl-, chloro-, bromotoluenes, dioxane and tetrahydrofuran, etc.

The following working examples of the present invention illustrate specific embodiments.

Example I.—Preparation of a polyesterpolyurethane foam

To a 100 ml. tumbler was added a polyester triol ($\overline{M}_w$=3000, OH No.=56.2) (30.0 g.) and 0.15 g. of anhydrous KF. The reaction mixture was heated at 100° C. with gentle mechanical stirring. After 20 minutes a silicone surfactant (0.30 g.) and 0.30 g. of stannous octoate were added to this heated mixture, the mixture stirred, and then 3.30 g. of adipodinitrile carbonate added. The resulting mixture was immediately stirred at 100 r.p.m.'s for twenty seconds then rapidly transferred to a 1000 ml. polypropylene beaker which was heated to 105° C. by an oil bath. The reaction mixture blew to 600 ml. volume in one minute to give a cellular polyurethane foam.

Example II.—Preparation of a polyesterpolyurethane foam

To a 100 ml. tumbler was added a polyester triol ($\overline{M}_w$=3000, OH No.=56.2) (28.5 g.), a polyester diol ($\overline{M}_w$=2000, OH No.=56.92) (1.5 g.) and 0.15 g. of anhydrous KF. The reaction mixture was heated at 100° C. with gentle mechanical stirring. After 20 minutes a silicone surfactant (0.30 g.) and 0.30 g. of stannous octoate were added to this mixture, the mixture stirred, and then 3.96 g. of adipodinitrile carbonate added. The resulting mixture was immediately stirred at 1000 r.p.m.'s for twenty seconds then rapidly transferred to a 1000 ml. polypropylene beaker which was heated to 105° C. by an oil bath. The reaction mixture blew to about 650 ml. volume in one minute to give a cellular polyurethane foam.

Example III.—Preparation of a polyesterpolyurethane foam

The reaction described in Example I was repeated except 3.96 g. of adiponitrile carbonate were used. The resulting foam appeared essentially the same as the foam from Example I.

Example IV.—Preparation of a polyetherpolyurethane foam

To a 100 ml. tumbler was added an ethylene oxide capped polyether triol ($\overline{M}_w=3000$, OH No.=58.2) and 0.30 g. of potassium fluoride. The reaction mixture was heated at 100° C. with gentle mechanical stirring. After 20 minutes a silicone surfactant (0.30 g.) and 0.30 g. of stannous octoate were added to this mixture, the mixture was stirred, and then 3.96 g. of adiponitrile carbonate were added. The rest of the reaction was identical to Example I. The resulting foamed material was tacky and shrunk on cooling.

Example V.—Preparation of polyesterpolyurethane foam

The reaction described in Example I was repeated using 0.075 g. of KF. The resulting foam was slightly tacky throughout.

Example VI.—Preparation of polyesterpolyurthane foam

The reaction described in Example V was repeated using 0.30 gms. of dibutyltin dilaurate instead of stannous octoate.

Example VII.—Preparation of polyesterpolyurethane foam

The reaction described in Example III was repeated using 0.15 g. of potassium fluoride and 0.15 g. of stannous octoate. The resulting foam was slightly tacky throughout.

Example VIII.—Preparation of polyesterpolyurethane foam

Example III was repeated using 0.60 g. of aluminum acetylacetonate in place of stannous octoate and 0.30 g. of potassium fluoride. The reaction occurred so fast that the ingredients blew out of tumbler.

Example IX.—Preparation of polyesterpolyurethane foam

The reaction described in Example VIII was repeated using 0.30 g. of aluminum acetylacetonate. Results were the same as Example VIII.

Example X.—Preparation of polyesterpolyurethane foam

The reaction described in Example III was repeated using 0.30 g. of aluminum acetylacetonate in place of stannous octoate and 0.15 g. of potassium fluoride. A slightly tacky polyurethane foam was obtained.

Example XI.—Preparation of a thermoplastic polyurethane

To a 100 ml. resin kettle, equipped with a mechanical stirrer, a nitrogen inlet, a material addition port and a vacuum take-off, were added 36.00 gms. of a 1000 $\overline{M}_w$ polyester diol (OH=110.4), 0.72 g. of tributyltin oxide and 0.18 g. of potassium fluoride. The reaction mixture was then heated at 100° C. under 1.5 mm. Hg pressure with stirring for one hour. A nitrogen atmosphere was then introduced into the resin kettle and maintained throughout the rest of the reaction. Adipodinitrile carbonate (8.1940 g.) was added over a 12 minute period of time with stirring. Dry toluene (36 ml.) is introduced immediately following completion of adipodinitrile carbonate addition. The reaction mixture is then heated at 100° C. for five hours then the toluene removed by vacuum. This gave a polymeric material having a $\overline{M}_w$ of 58,129.

Example XII

A polyester triol ($\overline{M}_w=3000$, OH No.=56.2) (30.0 g), 0.30 g. of aluminum acetylacetonate and 0.30 g. of potassium fluoride were heated at 100° C. for one hour with stirring. The reaction mixture was then cooled to room temperature, poured into a jar and 3.96 g. of adipodinitrile carbonate was mixed in. The jar was capped and allowed to stand at room temperature overnight. The next morning the jar was half filled with a slightly tacky polyurethane foam.

While specific materials, conditions and techniques have been disclosed herein and specific working examples of the best mode of operation have been set forth, it is to be understood that such are not to be considered limiting and that variations thereof will be apparent to one skilled in the art. Consequently, the present invention is to be limited only in accordance with the appended claims.

I claim:

1. In the method of preparing an organic compound having one or more urea, urethane or thiourethane groups obtained by condensing (A) a nucleophilic organic compound having at least one reactive hydrogen-containing radical selected from the group consisting of primary amino radicals, secondary amino radicals, hydroxyl radicals and mercapto radicals with (B) a cyclic nitrile carbonate having the structure:

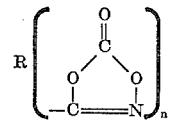

wherein R is an organic radical having from 1 to about 200,000 carbon atoms and is free of nucleophilic groups, and n is 1 to about 100,000, the improvement which comprises catalyzing the condensation reaction by contacting said (A) and (B) with a catalytically-effective amount of a fluoride compound selected from the group consisting of inorganic fluorides, quaternary ammonium fluorides and quaternary phosphonium fluorides.

2. The improvement of claim 1 wherein R is a hydrocarbon radical.

3. The improvement of claim 2 wherein R is an aliphatic radical.

4. The improvement of claim 2 wherein R is an aliphatic radical having from 2 to 30 carbon atoms.

5. The improvement of claim 2 wherein the cyclic nitrile carbonate is butane-1, 4-di (nitrile carbonate).

6. The improvement of claim 1 wherein n is 2 to 4.

7. The improvement of claim 6 wherein n is 2.

8. The improvement of claim 1 wherein the nucleophilic organic compound is a polyol.

9. The improvement of claim 8 wherein the polyol is a polyester triol.

10. The improvement of claim 8 wherein the polyol is a polyether triol.

11. The improvement of claim 1 wherein the fluoride compound is an alkali metal fluoride.

12. The improvement of claim 11 wherein the alkali metal fluoride compound is potassium fluoride.

13. The improvement of claim 1 wherein said fluoride compound is a quaternary ammonium fluoride.

14. The improvement of claim 1 wherein the catalytic fluoride compound is combined with at least one metal from Groups III through V of the Periodic System.

15. The improvement of claim 1 wherein said fluoride compound is a quaternary phosphonium fluoride.

16. The improvement of claim 8 wherein the polyol is a diol.

References Cited
UNITED STATES PATENTS

| | | | |
|---|---|---|---|
| 3,480,595 | 11/1969 | Burk et al. | 260—77.5 R |
| 3,531,425 | 9/1970 | Burk et al. | 260—859 PV |
| 3,652,507 | 3/1972 | Burk et al. | 260—859 R |

MAURICE J. WELSH, Primary Examiner

U.S. Cl. X.R.

260—2.5AB, 2.5AC, 77.5AB, 77.5AC, 482B, 482C, 553R